US012540411B2

(12) United States Patent
Schalenbach et al.

(10) Patent No.: US 12,540,411 B2
(45) Date of Patent: Feb. 3, 2026

(54) ARRANGEMENT OF ELECTROCHEMICAL CELLS (71) Applicant: Forschungszentrum Jülich GmbH, Jülich (DE)

(72) Inventors: Maximilian Schalenbach, Cologne (DE); Hermann Tempel, Kreuzau (DE); Hans Kungl, Heidelberg (DE); Rüdiger-A. Eichel, Jülich (DE)

(73) Assignee: Forschungszentrum Jülich GmbH, Jülich (DE)

( * ) Notice: Subject to any disclaimer, the term of this patent is extended or adjusted under 35 U.S.C. 154(b) by 361 days.

(21) Appl. No.: 18/025,509

(22) PCT Filed: Dec. 13, 2021

(86) PCT No.: PCT/EP2021/085383
§ 371 (c)(1),
(2) Date: Mar. 9, 2023

(87) PCT Pub. No.: WO2022/128856
PCT Pub. Date: Jun. 23, 2022

(65) Prior Publication Data
US 2023/0349056 A1  Nov. 2, 2023

(30) Foreign Application Priority Data

Dec. 16, 2020  (DE) .......................... 102020133770.1

(51) Int. Cl.
*C25B 9/00* (2021.01)
*C25B 9/17* (2021.01)
(Continued)

(52) U.S. Cl.
CPC .................. *C25B 9/63* (2021.01); *C25B 9/65* (2021.01); *C25B 9/77* (2021.01); *C25B 1/04* (2013.01)

(58) Field of Classification Search
CPC .... C25B 9/63; C25B 9/00; C25B 9/17; C25B 9/77; C25B 9/65; C25B 1/04; C25B 11/00
See application file for complete search history.

(56) References Cited

U.S. PATENT DOCUMENTS 3,880,670 A   4/1975  Shinn
3,950,239 A   4/1976  Figueras
(Continued)

FOREIGN PATENT DOCUMENTS

DE   102009016635 A1   10/2010
FR       3069107 A1    1/2019

OTHER PUBLICATIONS

International Search Report, PCT Application No. PCT/EP2021/085383, mailed Jun. 14, 2022 (8 pages).

*Primary Examiner* — Zulmariam Mendez
(74) *Attorney, Agent, or Firm* — Young Basile Hanlon & MacFarlane, P.C.

(57) ABSTRACT

An arrangement comprising electrochemical cells arranged adjoining one another in a stacking direction (x), wherein adjacent ones of the electrochemical cells are separated from one another by a respective electrically insulating separating element, wherein the electrochemical cells each have an anode chamber comprising an anode, a cathode chamber comprising a cathode, and a membrane arranged between the anode and the cathode chambers, wherein the anodes are each connected to the cathode of the electrochemical cell following in the stacking direction (x) via an electrically conductive connection, and wherein the electrically conductive connections pass through the separating element arranged between the respective anode and the respective cathode, and/or a boundary of the electrochemical cells. The electrically conductive connection between the anodes and the cathodes makes it possible to dispense with bipolar (Continued)

plates in the described arrangement. The arrangement is more cost-effective to produce and more efficient in operation than known arrangements.

8 Claims, 6 Drawing Sheets

(51) Int. Cl.
*C25B 9/63* (2021.01)
*C25B 9/65* (2021.01)
*C25B 9/77* (2021.01)
*C25B 11/00* (2021.01)
C25B 1/04 (2021.01)

(56) References Cited

U.S. PATENT DOCUMENTS

| | | |
|---|---|---|
| 4,518,113 A | 5/1985 | Pellegri |
| 2005/0048344 A1 | 3/2005 | Ishii |
| 2007/0095655 A1 | 5/2007 | Stadelmann et al. |
| 2007/0181419 A1 | 8/2007 | Maget |
| 2012/0152734 A1 | 6/2012 | Richards et al. |
| 2017/0167036 A1 | 6/2017 | Tew et al. |

ARRANGEMENT OF ELECTROCHEMICAL CELLS

This application is a 371 national stage application of International Application No. PCT/EP2021/085383, filed Dec. 13, 2021, which claims the benefit of the filing date of German Application No. 10 2020 133 770.1, filed Dec. 16, 2020, the contents of which are hereby incorporated by reference in their entireties.

The invention relates to an arrangement of electrochemical cells, in particular for an alkaline electrolysis of water.

It is known from the prior art to carry out electrolysis using what are known as stacks of electrolytic cells. These are arrangements of electrolytic cells. The individual cells are not contacted individually. Instead, what is known as a bipolar plate is arranged between the adjacent cells, which plate is connected on one side to the anode of one adjacent cell, and on the other side to the cathode of the other adjacent cell. The two sides of the bipolar plate are at the same electrical potentials. However, this is different relative to the electrolytes adjoining on both sides, as a result of which the designation of the bipolar plate is justified. A current flows through the bipolar plate from one cell to the next cell via the bipolar plate. Thus, all the cells are supplied with electrical energy by connecting the anode to a voltage source by one of the two cell arranged at the edge of the stack, and the cathode being connected to this voltage source by the other cell arranged at the edge of the stack. The generally metal electrodes are pressed onto the metal bipolar plates to ensure electrical contact between the electrodes and the bipolar plate, but this is accompanied by not inconsiderable contact resistances. Oxide layers, which additionally increase the transition resistance between the respective electrode and the bipolar plate, can grow at the boundary surfaces between the electrodes and the bipolar plate. The electrolyte in a cell is in direct contact with both electrodes, so that a liquid electrolyte as in the case of alkaline electrolysis is likewise in contact with the bipolar plate. In order that the bipolar plate does not corrode by the electrolyte and the applied potentials, the bipolar plate is generally coated with corrosion-resistant metals.

However, the use of bipolar plates requires a considerable amount of material. In addition, transition resistances between the electrodes and the bipolar plates are considerable. Scratches on the bipolar plates can lead to typically galvanically applied protective layers being peeled off and the underlying substrate dissolving as a result. Furthermore, such a protective layer requires expensive production and an expensive material, since thick metal layers of expensive metals such as nickel, platinum or gold are often used for bipolar plates. Known bipolar plates also have a complicated three-dimensional design with channels and inlets and outlets. Known stacks are thus expensive to produce and energetically inefficient in operation.

It is an object of the present invention to provide an arrangement of electrochemical cells, which is more cost-effective to produce and more efficient in operation, proceeding from the described prior art.

This object is achieved by means of the arrangement according to the independent claim. Advantageous embodiments are specified in the dependent claims. The features presented in the claims and in the description can be combined with one another in any technologically meaningful way.

According to the invention, an arrangement is presented which has a plurality of electrochemical cells arranged adjoining one another in a stacking direction, with adjacent ones of the electrochemical cells being separated from one another by a respective electrically insulating separating element, the electrochemical cells each having an anode chamber comprising an anode, a cathode chamber comprising a cathode, and a membrane arranged between the anode chamber and the cathode chamber, wherein the anodes are each connected to the cathode of the electrochemical cell following in the stacking direction via at least one electrically conductive connection which is preferably separated from the respective anode chamber and the respective cathode chamber, and the electrically conductive connections passing through the separating element arranged between the respective anode and the respective cathode and/or a boundary of the electrochemical cells.

The described arrangement makes do without bipolar plates. In this respect, the material outlay is reduced. In addition, the operation of the described arrangement is particularly efficient in terms of energy, because there are no energy losses due to transition resistances between electrodes and bipolar plates.

The arrangement can in particular be designed for electrolysis. In that case, the arrangement can also be referred to as an electrolysis arrangement. The electrolysis arrangement is preferably configured for alkaline water electrolysis. However, the electrolysis arrangement can also be configured for other electrochemical systems, such as for chloralkali electrolysis. Alternatively, the arrangement can be designed, for example, as a battery or fuel cell.

The arrangement comprises a plurality of electrochemical cells. An electrochemical cell is to be understood as an element which is configured for carrying out an electrochemical process. In particular, the electrochemical cells can be electrolytic cells, galvanic cells, electrodialysis cells, fuel cells or battery cells. Preferably, all the electrochemical cells of the arrangement are designed identically, in particular all as electrolytic cells. In the case of electrolytic cells, the arrangement can also be referred to as an electrolysis stack, or as a stack for short.

Each of the electrochemical cells has an anode chamber comprising an anode, a cathode chamber comprising a cathode, and a membrane arranged between the anode chamber and the cathode chamber. The membrane can also be referred to as a diaphragm. The anode and the cathode are also referred to below as electrodes. In particular for the alkaline water electrolysis, the electrodes are preferably formed of nickel. Nickel electrodes can be hot-galvanized and subsequently specifically etched in order to obtain large catalytic surfaces. It is therefore generally preferred for the anode and/or the cathode of at least one of the electrochemical cells to be formed from hot-galvanized nickel. The electrochemical cells can be operated using an electrolyte. For example, the electrochemical cells can be designed as electrolytic cells which are configured for electrolysis of the electrolyte. The electrolyte is preferably an alkaline solution. Irrespective of the application, the electrochemical cells are designed such that the electrolyte can come into contact with the anode and the cathode. To this end, the electrochemical cells have a respective anode chamber for the anode and a respective cathode chamber for the cathode. In operation, the anode chambers and the cathode chambers are at least partially filled with the electrolyte. The anode chambers and the cathode chambers of the electrochemical cells are connected to one another via the respective membrane such that the membrane is ion-conducting but electrically insulating.

The electrochemical cells are arranged so as to adjoin one another in a stacking direction. This means that the electrochemical cells are generally arranged in a row, adjacent ones of the electrochemical cells adjoining one another. The direction in which the electrochemical cells are arranged adjoining one another is referred to as the stacking direction. The arrangement is described below using a coordinate system in which the stacking direction is a first direction and which also has a second and a third direction, the stacking direction, the second direction and the third direction being perpendicular to one another in pairs. However, it is only preferred but not necessary for the electrochemical cells to be arranged along a straight line. The described functionality with the described advantages can be achieved equally when adjacent electrochemical cells are oblique to one another. For example, the electrochemical cells can be arranged along an arc of a circle. The stacking direction can thus be curved. An angle between adjacent electrochemical cells is preferably at most 20°.

Adjacent ones of the electrochemical cells are separated from one another by a respective separating element. The separating elements are electrically insulating and can consist of corrosion-resistant materials such as plastics or ceramics. The separating elements differ from the bipolar plates known from the prior art in particular in this way. The fact that the separating elements are electrically insulating means that there is no electrical connection between the two opposing surfaces of the separating element. The separating elements are preferably plate-shaped. It is not necessary for the separating elements to be formed completely from electrically insulating material. It is possible for the separating elements to consist of corrosion-resistant surfaces which cover an electrically conductive material such as a metal. Such a covered metal plate is protected against electrochemical corrosion and imparts mechanical stability to the separating element. For the described function of the separating elements, it is sufficient for the surfaces to be electrically insulated from one another. It is possible that the surfaces themselves are formed from an electrically conductive material, but are separated from one another by an electrically insulating material, such that there is no electrical connection between the surfaces. This is the case, for example, for a plastics plate which is coated on both sides with a metal. Preferably, the separating elements extend over an entire cross section of the electrochemical cells when viewed in a plane perpendicular to the stacking direction. It is preferred that the electrolyte chambers are each delimited by one of the membranes, a boundary of the electrochemical cells, and one of the separating elements. The boundary can be formed for all electrochemical cells together, or comprise a respective part for each of the electrochemical cells. In this respect, the electrolyte chambers on all sides can be delimited continuously by an electrically insulating material.

The anodes are in each case electrically conductively connected to the cathode of the electrochemical cell following in the stacking direction, preferably via a metal connection that is covered or sealed by the electrolyte. This statement is naturally only applicable to the extent that there is a following electrochemical cell in the stacking direction. This statement therefore does not apply to the electrochemical cell arranged at the end of the arrangement in the stacking direction. This connection takes place via the respective separating element. If the arrangement has three electrochemical cells, for example, the cathode of the first electrochemical cell is connected to a voltage source, the anode of the first electrochemical cell is connected to the cathode of the second electrochemical cell, the anode of the second electrochemical cell is connected to the cathode of the third electrochemical cell, and the anode of the third electrochemical cell is connected to the voltage source. Any number of electrochemical cells can be provided between the electrochemical cells at the edge of the arrangement, here the first and third electrochemical cells. Preferably, the arrangement has at least 5 and/or at most 200 of the electrochemical cells.

As a result of the electrical connection of the electrodes of adjacent cells, all the electrochemical cells can be electrically contacted in that in each case just one of the electrodes of the electrochemical cells arranged at the edge of the arrangement are directly connected to a voltage source. The remaining electrodes are indirectly connected to the voltage source via other electrodes, via the electrical connections between them, and via the electrolyte. The electrical connection between the electrodes of the adjacent electrochemical cells makes it possible to dispense with the bipolar plates. This is revealed in the fact that the separating elements between the electrochemical cells are designed to be electrically insulating. This is not possible in an embodiment comprising bipolar plates known according to the prior art.

The electrically conductive connection comprises the electrically conductive material which is arranged between the respective anode and the respective cathode and via which a continuous electrical conduction path is formed between the anode and the cathode. The electrically conductive connection can be integrally formed with the anode and/or with the cathode, for example by laser welding. In the case of laser welding, there is only a comparatively low temperature input, such that plastics parts are preserved. Alternatively, the electrically conductive connection can be formed using a separate element. Thus, the electrically conductive connection can be formed in that the respective anode and the respective cathode are connected to one another by one at least one connecting pin such as a screw or a rivet. For this purpose, it is preferred that the electrodes each have at least one through-hole, at least one thread, and/or at least one bushing, by means of which the at least one connecting pin can be connected to the respective electrode. The at least one through-hole, the at least one thread and/or the at least one bushing of the respective anode is preferably opposite the at least one through-hole, the at least one thread and/or the at least one bushing of the respective cathode. As a result, the at least one connecting pin can pass through the corresponding separating element and thus connect the respective anode and the respective cathode to one another. The fact that the electrically conductive connection passes through the separating element arranged between the connected electrodes can also be the result of the electrically conductive connection comprising a part of the separating element. The electrically conductive connection is preferably at the same time a mechanical connection via which the electrodes are held. Alternatively or additionally, the electrically conductive connection can pass through the boundary of the electrochemical cells. In any case, the electrochemical connection thus passes through an element which surrounds the electrolyte in the respective electrochemical cell. This element can be the separating element between the respective electrochemical cells or the boundary of the electrochemical cell.

Furthermore, it is preferred that the electrically conductive connections pass through the respective separating element and/or the boundary of the electrochemical cells in a fluid-tight manner. This means that the electrolyte from the electrolyte chambers cannot escape from the electrolyte chamber at the passage point of an electrically conductive connection. Particularly preferably, the electrically conductive connections pass through the respective separating element and/or the boundary of the electrochemical cells in a gas-tight manner. In this case, a gas formed in the electrolyte chamber cannot escape from the electrolyte chamber either. The fluid-tight or gas-tight formation of the passage points can be achieved, for example, by seals. It is thus preferred that at least one seal is arranged between the electrically conductive connections and the separating element or the boundary. This can prevent electrolyte from coming into contact with a connecting pin, for example.

Preferably, the electrically conductive connection is separated from the anode chamber and the cathode chamber. This means that the electrically conductive connection does not come into contact with an electrolyte in the anode chamber and/or in the cathode chamber during operation. The bipolar plates known from the prior art, in contrast, come into contact with the electrolyte, resulting in corresponding demands on the material of the bipolar plates, especially with regard to corrosion resistance and electrical conductivity. In the case of the described arrangement, however, the electrically conductive connection can be formed from any, and in particular a low-cost, material, for example from steel. The electrochemical properties of the material of the electrical connection are not important. The electrical connection can be separated from the anode chamber and/or from the cathode chamber, for example by means of a casing and/or a seal. For example, the electrically conductive connection can be a connecting pin having a plastics coating and/or having a plastics cover.

Thus, the embodiment of the arrangement is preferred in which the electrically conductive connection is separated from the respective anode chamber and the respective cathode chamber by a casing and/or a seal.

In a further preferred embodiment of the arrangement, the anodes and/or the cathodes each have a plurality of mesh carriers and a metal mesh fastened thereto. The "and" case is preferred.

The anodes and/or the cathodes preferably also each have at least one fastening element. An electrical contact between the electrodes of the adjacent electrochemical cells can be established via the fastening elements, in particular via connections which pass through the respective separating elements. The electrodes are preferably implemented in the manner of skeletal construction.

In this embodiment, the electrodes are self-supporting. The electrode can fulfill its task in particular by the metal mesh. Preferably, the metal mesh comprises a catalyst material. This is located at a small distance from the membrane. The mesh carriers serve in particular to hold the metal mesh. The mesh carriers are preferably made of metal, preferably of the same material as the metal mesh and the fastening element. Preferably, the metal mesh and the mesh carriers are formed from nickel. For example, the mesh carriers can be welded to the metal mesh. The fastening elements and the holding element can likewise be welded, in particular by means of laser welding, or can be made in one piece. The welding, in particular laser welding, can take place after the elements to be connected to one another have been plugged together. In the case of laser welding, there is only a comparatively low temperature input, such that plastics parts are preserved. A metallic and integral connection between the holding element and the remainder of the electrode is advantageous due to low electrical resistances. The entire electrode can subsequently be hot-galvanized and specifically etched to obtain large catalytic surfaces. It is therefore generally preferred that, in the case of the anode and/or in the case of the cathode of at least one of the electrochemical cells, the mesh carriers and the metal mesh attached thereto are formed from hot-galvanized nickel. The electrical conductivity between the metal mesh and the mesh carriers is maintained in this case. The metal mesh is preferably formed in a plane perpendicular to the stacking direction. The mesh carriers preferably have an axis which is oriented in the stacking direction. The mesh carriers are preferably formed as a metal flat strip. Preferably, the mesh carriers are oriented perpendicularly to the metal mesh.

The anodes can in each case be integrally bonded to the cathode of the electrochemical cell following in the stacking direction by means of at least one connecting pin, for example by welding, in particular laser welding. Subsequently, the corresponding separating element can be produced between the anode and cathode, for example by casting, clamping or gluing the separating element in place. In this case, no holes, bushes or threads have to be provided on the anodes and/or on the cathodes. Thus, the embodiment of the arrangement is preferred in which the electrically conductive connections are formed in that the anodes are each integrally bonded to the cathode of the electrochemical cell following in the stacking direction, for example by means of laser welding, the separating element being cast, clamped and/or adhesively bonded between the respective anode and the respective cathode. Alternatively, the anode and cathode can also be connected by the partition wall, the connecting pin being welded after the anode, cathode and the separating element are arranged.

In a further preferred embodiment of the arrangement, at least one respective spring element is provided for each of the metal meshes, said spring element being designed to tension the metal mesh away from the closest separating element in each case, and to bring it closer to the membrane.

The arrangement therefore has spring elements which are each arranged between a metal mesh and a separating element, and are designed to tension the respective metal mesh away from the corresponding separating element.

The spring elements serve to bring the metal meshes close to the respective membrane. The spring elements thus generate a force which acts on the respective metal mesh in parallel with the stacking direction. As a result, the distance between the metal mesh and the opposite membrane is reduced, whereby the efficiency of the electrolysis can be increased. The spring elements can be formed from plastics or metal. For example, the spring elements can each be realized as a piece of fleece, a spring, or a curved wire piece.

In a further preferred embodiment of the arrangement, the electrically conductive connections each comprise a connecting element arranged outside a boundary of the electrochemical cells.

In this embodiment, the electrodes are not connected to one another via the corresponding separating element, but via a connecting element arranged outside the boundary of the electrochemical cells. The connecting element is preferably formed from metal. Since the connecting element is arranged outside the boundary of the electrochemical cells, it does not come into contact with the electrolyte. The connections between the electrodes and the connecting element are preferably separated from the anode chambers and the cathode chambers. The electrolyte therefore does not come into contact with the connection. In this embodiment, it is preferred that the electrically conductive connections each pass through the boundary of the electrochemical cells. It is not necessary for the electrically conductive connections to also pass through a separating element.

In a further preferred embodiment of the arrangement, the electrically conductive connections each comprise at least one connecting pin between the respective anode and the respective cathode.

The connecting pin can be a screw, a rivet or a bolt. The connecting pin is preferably formed from metal. Preferably, the anodes are each directly connected, via at least one connecting pin, to the cathode of the electrochemical cells following in the stacking direction. This means that the anode and the cathode connected thereto are each directly in contact with the connecting pin. Alternatively, the anodes can each be indirectly connected, via at least one connecting pin, to the cathode of the electrochemical cell following in the stacking direction. For example, the anode can be connected directly to a connecting element arranged outside the boundary of the electrochemical cells by a connecting pin, and the corresponding cathode can be connected directly to the connecting element by a further connecting pin. Thus, the anode and the cathode can be screwed to the connecting element and in this respect be indirectly connected to one another via two screws as connecting pins.

In a further preferred embodiment of the arrangement, the separating elements each have an electrically conductive core and an electrically insulating cover, the electrically conductive connections each comprising the electrically conductive core of the separating element arranged between the respective anode and the respective cathode.

Due to the electrically insulating cover, the electrolyte does not come into contact with the electrically conductive core of the separating elements. Any, and in particular a low-cost, material, in particular a metal such as steel, can be used for the core. In comparison with the bipolar plates known from the prior art, the separating elements are therefore less expensive because the electrochemical properties of the metallic core are not important due to the separation from the electrolyte. The separating elements are particularly stable due to the metal core. Connecting the electrodes to one another via the metal core allows a particularly simple and compact design of the arrangement. Due to this electrical connection via the core of the separating element, the two opposite sides of the core are at different electrical potentials, as is also known in the case of the bipolar plates known from the prior art. However, the described separating elements differ from these by the electrically insulating cover. As a result of this, a lower-cost material can be selected for the core than for the known bipolar plates, because the core of the separating elements, unlike the bipolar plates, does not come into contact with the electrolyte.

In a further preferred embodiment of the arrangement, the electrochemical cells are delimited by a boundary made of plastics, metal stabilizing elements being provided within the boundary.

The boundary can be formed by walls between which the electrolyte chambers are formed. The boundary extends over all electrochemical cells and can be formed in one piece or can be composed of respective boundary parts for the individual electrochemical cells. The boundary can be designed, for example, as a surrounding wall in the stacking direction. A boundary made of plastics is particularly low-cost, and moreover has no influence on the electrochemical processes that take place within the electrochemical cells. However, plastics can deform under the influence of temperature and pressure. This is counteracted by the metal stabilization elements. Preferably, the stabilization elements are designed and arranged such that they enable, in particular, a stabilization with respect to forces acting in parallel with the stacking direction. Because the metal stabilization elements are arranged within the boundary made of plastics, the metal stabilizing elements do not come into contact with the electrolyte within the electrochemical cells.

In a further preferred embodiment of the arrangement, the electrical connections each comprise two connecting pins which point in mutually opposing directions.

In this embodiment, the connecting pins have a preferred direction. As a result, it can be seen whether two connecting pins are oriented opposingly to one another or in parallel with one another. Preferably, the connecting pins are designed as screws. Two screws face in opposite directions in particular when a first screw is screwed from a first side through a separating element, and a second screw is screwed from a second side through the separating element. The same applies to other connecting pins. Thus, the electrically conductive connection can be formed by first connecting a first electrode from a first side to the corresponding separating element and subsequently connecting a second electrode from a second side to the separating element.

In this embodiment, it is preferred that the separating elements have a core, and that a cover is arranged in each case between the electrodes and the core of the respective separating element. The core can be formed from a metal. The anode and the corresponding cathode can be connected to one another by first applying a cover to a first side of the core of the separating element. Subsequently, the cathode can be fastened to the core of the separating element by a connecting pin. A further cover can then be applied to a second side of the core of the separating element, and the anode can be fastened to the core by a second connecting pin. Finally, the second connecting pin, in particular a head of the second connecting pin, can be sealed with a sealing. As a result, the core of the separating element is separated from the electrolyte on both sides by the covers or by the sealing.

In a further preferred embodiment, the electrically conductive connections are formed having a respective bushing comprising a thread on one of the electrodes, and having a through-hole on the other electrode, the through-hole preferably having a cross section which is tapered towards the respective separating element.

The fact that the through-hole has a cross section which is tapered in the direction of the respective separating element means that the cross section becomes smaller in the direction towards the separating element. As a result, a screw having a conical head can be used as a connecting pin for connecting the two electrodes. The head of the screw can be sealed with a sealing. Due to the conical shape of the head, the sealing can rest against a particularly large surface of the head.

In a further preferred embodiment of the arrangement, the anode and the cathode are formed by a respective metal mesh, the arrangement further comprising an electrically conductive plate, the metal mesh forming the cathode being connected to the plate, the electrically conductive connection being formed by a connecting pin which is connected to the anode and which is connected to the plate. The connecting pin is preferably connected to the plate by laser welding.

In this embodiment, the anode and the cathode are formed by a respective metal mesh, which is preferably formed from nickel. The anode is connected to the cathode via the connecting pin. The connecting pin therefore constitutes the electrically conductive connection. Preferably, the connecting pin is formed from nickel.

In this embodiment, the separating element is preferably formed from plastics, in particular from polypropylene. The plate can be made of steel, for example. Since the plate and the metal mesh are electrically conductive, the plate can also contribute to the function of the cathode and thus be regarded as part of the cathode.

The plate can come into contact with the electrolyte in the cathode chamber. This does not preclude the above-described advantage that, in the embodiment having the electrically conductive connection separated from the anode chamber and cathode chamber, the electrically conductive connection can be formed from any, and in particular a low-cost, material, for example from steel. In this respect, it should be noted that different requirements are imposed on the anode chamber and the cathode chamber, in particular with regard to corrosion resistance. A low-cost material such as steel can more readily be used at the cathode than at the anode. The anode chamber is preferably delimited by nickel. In particular in the case of alkaline electrolysis, the requirements on the cathode chamber and on the cathode are comparatively low. Therefore, it is sufficient to use the expensive nickel only for the anode chamber. In general, the described embodiment makes it possible to achieve a particularly small cross section of the material which is exposed to a strong corrosive medium.

The metal mesh forming the cathode can be attached directly to the plate. This can be facilitated by the fact that the plate is structured on the cathode side, for example by means of corrugations or ribs. On the anode side, the connecting pin is connected to the metal mesh forming the anode. In the preferred case that the anode and the cathode are connected to one another via more than one connection designed as described, the connecting pins can be connected to one another, for example, via a metal strip, to which the metal mesh forming the anode can be fastened. Preferably, the connecting pin has a collar on the anode side, over which a seal can be pressed against the separating element. By means of the seal, the anode chamber and the cathode chamber can be separated from one another in a fluid-tight manner.

An embodiment is also conceivable which differs from the presently described embodiment only in that anode and cathode are swapped for one another. As described above, however, such an embodiment is less preferred in view of the different requirements in the anode chamber and cathode chamber with regard to corrosion resistance.

As a further aspect of the invention, an arrangement comprising a plurality of electrochemical cells arranged adjoining one another in a stacking direction is presented, wherein adjacent ones of the electrochemical cells are separated from one another by a respective electrically insulating separating element, wherein the electrochemical cells each have an anode chamber comprising an anode, a cathode chamber comprising a cathode, and a membrane arranged between the anode chamber and the cathode chamber, the anodes each being connected to the cathode of the electrochemical cell following in the stacking direction via an electrically conductive connection which is separated from the respective anode chamber and the respective cathode chamber, and the electrically conductive connections passing through the separating element arranged between the respective anode and the respective cathode, and/or a boundary of the electrochemical cells.

The features and advantages described above are applicable and transferable to this arrangement.

The invention is explained in more detail below with reference to the drawings. The drawings show particularly preferred embodiments to which the invention is not limited, however. The drawings and the proportions shown therein are only schematic. In the drawings.

Figure 1:
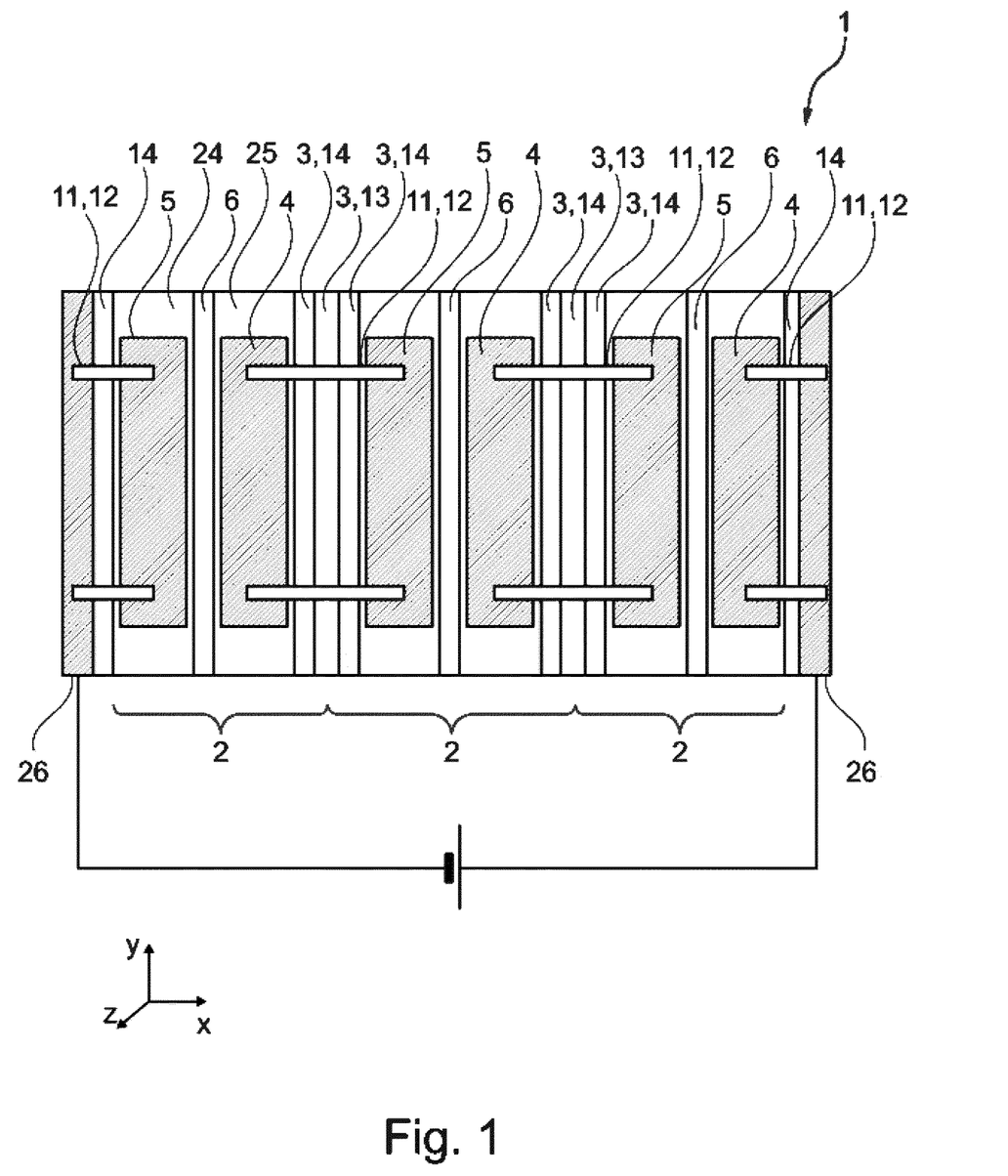
FIG. 1 shows an arrangement according to the invention.

FIG. 1 shows an arrangement 1 comprising three electrochemical cells 2, which are designed as electrolytic cells. The electrochemical cells 2 are arranged next to one another in a row in a stacking direction x and adjoin one another. In addition to the stacking direction x, a second direction y and a third direction z are shown. The electrochemical cells 2 each comprise an anode 4 and a cathode 5, and a membrane 6 arranged therebetween. The anodes 4 are arranged in a respective anode chamber 24, and the cathodes 5 are arranged in a respective cathode chamber 25. For the sake of clarity, only the anode chamber 24 and the cathode chamber 25 of the left-hand electrochemical cell 2 are provided with reference signs. The anode chambers 24 and the cathode chambers 25 are delimited by a boundary 23 of the electrochemical cells 2. Adjacent electrochemical cells 2 are separated from one another by a respective electrically insulating separating element 3. In the embodiment shown, two separating elements 3 are present. The separating elements 3 each have an electrically conductive core 13 and an electrically insulating cover 14 in the form of a coating or casing. The casing can be of a thickness of up to 20 mm.

The cathode 5 of the left-hand electrochemical cell 2 is connected to an end plate 26 via two connecting pins 12 as the electrically conductive connection 11. The anodes 4 are each connected via two connecting pins 12, as the electrically conductive connection 11, to the cathode 5 of the electrochemical cell 2 following in the stacking direction x. This means that the anode 4 of the left-hand electrochemical cell 2 is connected to the cathode 5 of the middle electrochemical cell 2, and that the anode 4 of the middle electrochemical cell 2 is connected to the cathode 5 of the right-hand electrochemical cell 2. No further electrochemical cell 2 follows the right-hand electrochemical cell 2 in the stacking direction x, and therefore the anode 4 of the right-hand electrochemical cell 2 cannot be electrically conductively connected to the cathode 5 of an electrochemical cell 2 following in the stacking direction x. Instead, the anode 4 of the right-hand electrochemical cell 2 is connected to an end plate 26 via two connecting pins 12 as the electrically conductive connection 11. The two end plates 26 are connected to a voltage source. The end plates 26 are separated from the adjacent anode chamber 24 or cathode chamber 25 by a respective cover 14.

The connection between the anodes 4 and the cathodes 5 takes place via connecting pins 12. These are separated from the anode chambers 24 and the cathode chambers 25 (which is not highlighted in the schematic representation of FIG. 1). This means that the electrolyte in the anode chambers 24 and the cathode chambers 25 does not come into contact with the connecting pins 12. Due to the fact that the connecting pins 12 pass through the separating elements 3, including the respective electrically conductive core 13, the anodes 4 and the cathodes 5 can be connected via the electrically conductive core 13 of the corresponding separating element 3 in the event of contact with the conductive core, but do not have to be when there is no contact.

Figure 2:
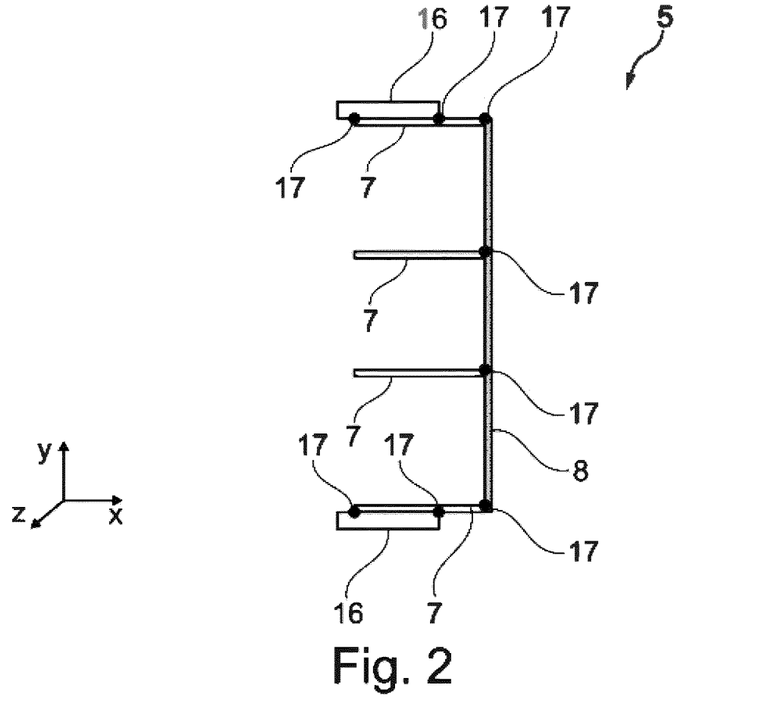
FIG. 2 shows a first side view of a cathode for an arrangement according to FIG. 1.

FIG. 2 shows a cathode 5 for an arrangement 1 according to FIG. 1. An anode 4 can be designed in the same way. However, the electrode shown is oriented like the cathodes 5 in FIG. 1. An anode 4 would accordingly be mirrored about the plane from the second direction y and third direction z.

The cathode 5 has a plurality of mesh carriers 7 and a metal mesh 8 fastened thereto. Fastening elements 16, via which the cathode 5 can be connected to the anode 4 of an adjacent electrochemical cell 2, are arranged on the mesh carriers 7. The fastening elements 16 each comprise, for example, a thread for a screw. The mesh carriers 7 are connected via welding points 17 to the fastening elements 16 and to the metal mesh 8. Alternatively, the holding elements 16 and the fastening elements can be made in one piece. In a further embodiment, the connection between the metal mesh 8 and the mesh carriers 7 can be carried out by sintering.

Figure 3:
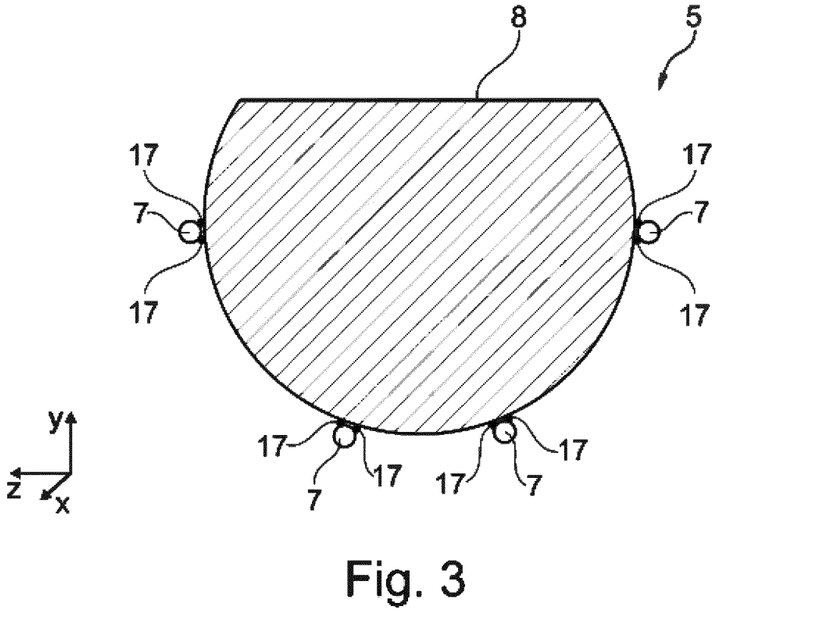
FIG. 3 shows a second side view of the cathode from FIG. 2.

FIG. 3 shows the cathode 5 from FIG. 2 from a further perspective. The cathode 5 shown is suitable in particular for an arrangement 1 which have anode chambers 24 and cathode chambers 25 having a round cross section when viewed perpendicularly to the stacking direction x.

Figure 4:
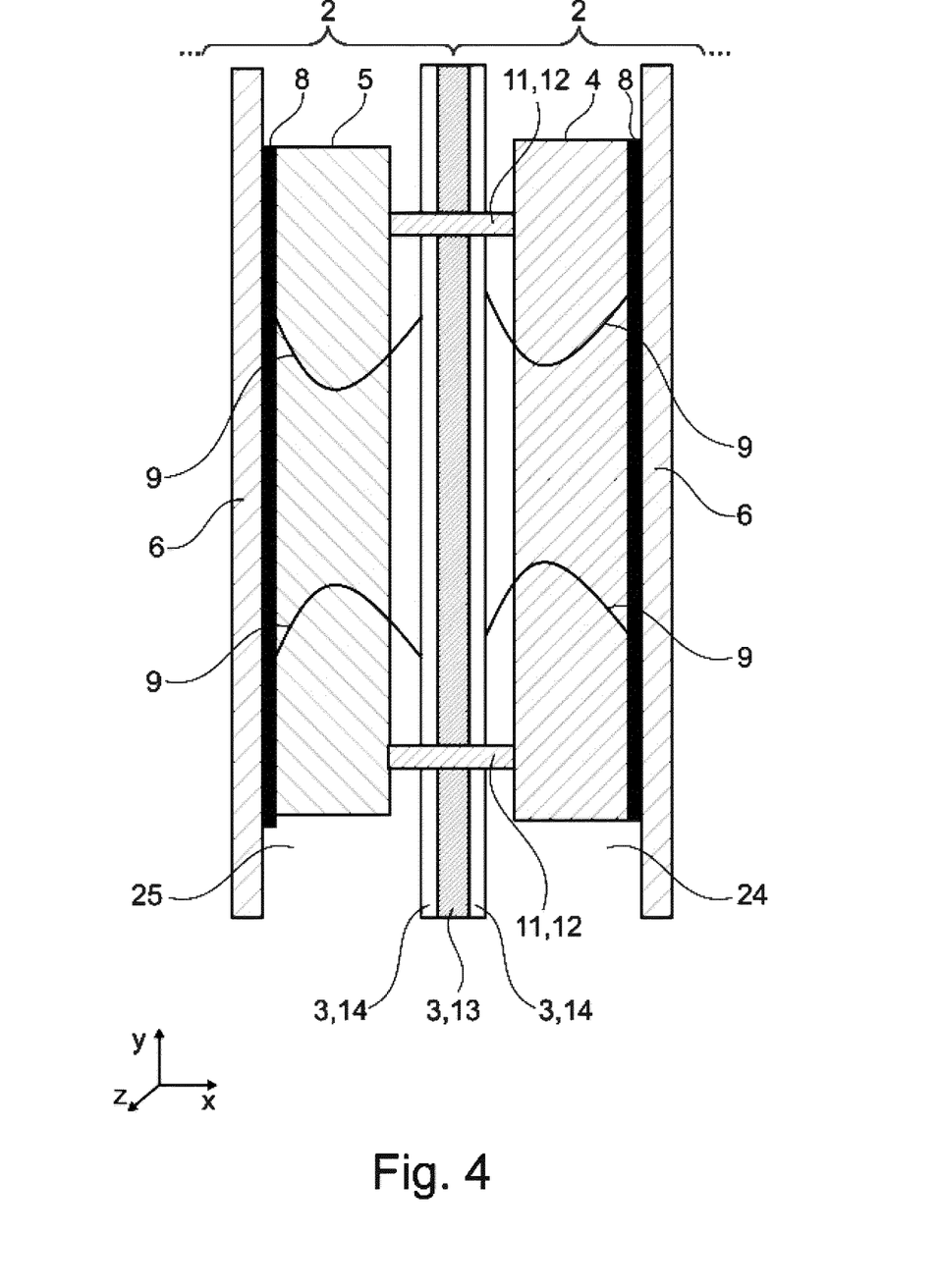
FIG. 4 shows a detailed view of an arrangement according to FIG. 1,
FIGS. 5a to 5h show various connections between electrodes for an arrangement according to FIG. 1.

FIG. 4 shows a detailed view of an arrangement 1 according to FIG. 1. Here, half of two electrochemical cells 2 are shown in each case. The membrane 6, the anode chamber 24 or the cathode chamber 25, and one of the electrodes 4,5 with the metal mesh 8, are shown in each case. The separating element 3 comprising the core 13 and the cover 14 is shown between the two electrolyte cells 2. The cathode 5 of the left-hand electrolyte cell 2 is connected to the anode 4 of the right-hand electrolyte cell 2 via two connecting pins 11. It is also shown that two respective spring elements 9 are arranged between the metal meshes 8 and the separating element 3, said spring elements being designed to tension the metal mesh 8 away from the separating element 3. The metal mesh 8 of the left-hand electrochemical cell 2 is thus tensioned to the left, and the metal mesh 8 of the right-hand electrochemical cell 2 to the right.

FIGS. 5a to 5g show different electrically conductive connections 11 between electrodes 4,5 for an arrangement 1 according to FIG. 1. The designation of the electrodes 4,5 as an anode 4 and cathode 5 is only by way of example. In all embodiments of FIGS. 5a to 5f, the anode 4 and the cathode 5 could also be swapped. In all cases, the electrodes 4,5 are connected directly to one another via a connecting pin 12 as the electrically conductive connection 11. The separating element 3 could therefore be formed entirely of plastics, for example. For reasons of stability, however, it is nevertheless preferred for the separating element 3 to have a metal core 13 and an electrically insulating cover 14. This is shown in FIGS. 5a to 5f. Furthermore, in the embodiments of FIGS. 5a to 5f, it is possible in each case to use flat or ring seals in order to keep the electrolyte away from the electrically conductive connection 11. In all the variants shown here, seals 27 are used so that the electrolyte cannot penetrate into the connection point.

Figure 5A:
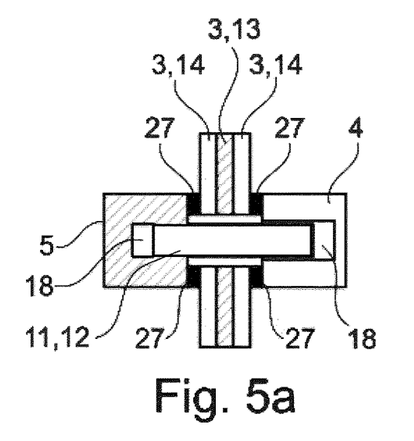

In FIG. 5a, the electrodes 4,5 are connected via a connecting pin 12, which engages in a respective bushing 18 of the electrodes 4,5. If the connecting pin 12 is a rivet pin, the electrically conductive connection 11 can be formed by crimping. If the connecting pin 12 is a threaded pin, the electrodes 4,5 can be connected to one another by rotation. A seal 27 is arranged in each case between the electrodes 4,5 and the cover 14 of the separating element 3. The seals 27 prevent electrolyte from coming into contact with the connecting pin 12 via the intermediate spaces between the electrodes 4,5 and the covers 14 of the separating element 3.

Figure 5B:
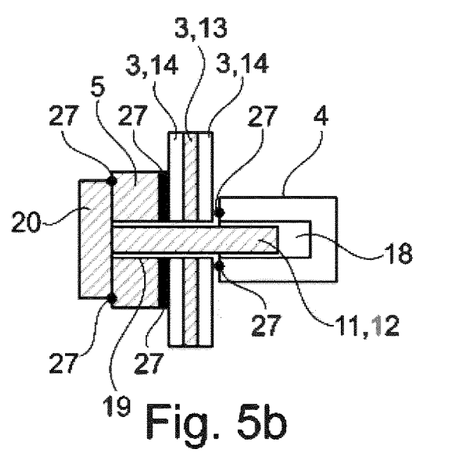

In FIG. 5b, the anode 4 comprises a bushing 18, whereas the cathode 5 comprises a through-hole 19. A screw, as a connecting pin 12, extends through the through-hole 19 and is screwed into the bushing 18. A head 20 of the screw rests on the edge of the through-hole 19, on the outside. A seal 27 is arranged in each case between the electrodes 4,5 and the cover 14 of the separating element 3. A further seal 27 is arranged between the head 20 of the screw and the cathode 5. This seal 27 is designed such that it does not pose an obstacle to an electrically conductive contact between the head 20 of the screw and the cathode 5.

Figure 5C:
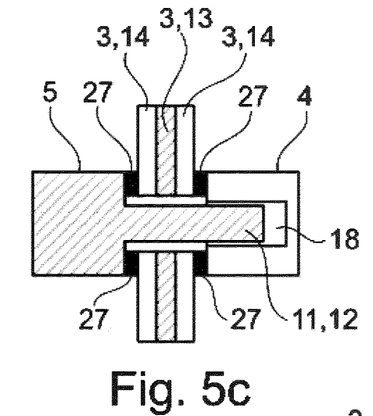

In FIG. 5c, the connecting pin 12 is formed integrally with the cathode 5. The connecting pin 12 is screwed or pressed into the bushing 18 of the anode 4. In this embodiment too, a seal 27 is arranged in each case between the electrodes 4,5 and the cover 14 of the separating element 3.

Figure 5D:
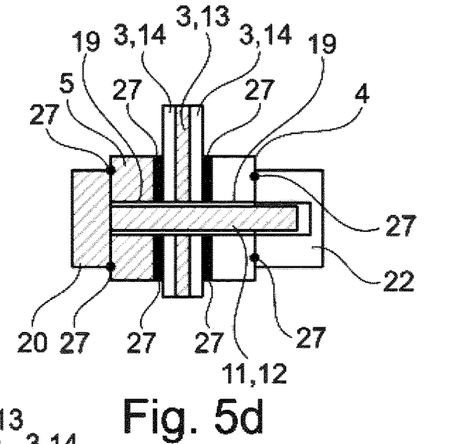

In FIG. 5d, both electrodes 4,5 have a respective through-hole 19 through which a screw extends as a connecting pin 12. On the side of the anode 4, a nut 22 rests on the edge of the through-hole 19; on the side of the cathode 5, a head 20 of the screw rests on the edge of the through-hole 19. In this embodiment too, a seal 27 is arranged in each case between the electrodes 4,5 and the cover 14 of the separating element 3. In addition, further seals 27 are arranged between the head 20 of the screw and the cathode 5, and between the nut 22 and the anode 4. The latter are designed such that they do not pose an obstacle to an electrically conductive contact between the head 20 of the screw and the cathode 5, or between the anode 4 and the nut 22.

Figure 5E:
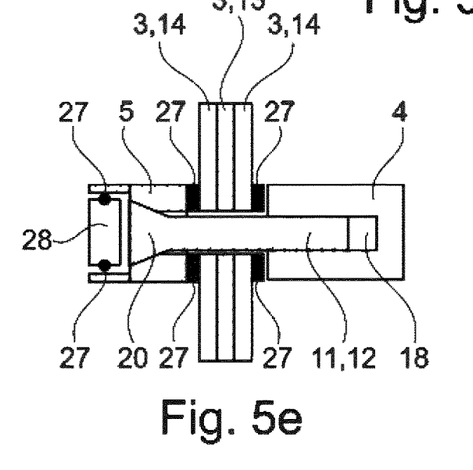

In FIG. 5e, the anode 4 has a bushing 18, into which a screw engages as a connecting pin 12. A head 20 of the screw is covered with a sealing 28. As shown here, the sealing 28 can be sealed with seals 27. Alternatively, the sealing 28 could be screwed, glued or fused on. The head 20 of the screw is formed obliquely. A particularly large contact surface is thus provided between the fastening element and the screw. In this embodiment too, a seal 27 is arranged in each case between the electrodes 4,5 and the cover 14 of the separating element 3. In this embodiment, the electrically conductive connection 11 is formed with the threaded bushing 18 on the anode 4 and with the through-hole 19 on the cathode 5, the through-hole having a cross section tapering to the right.

Figure 5F:
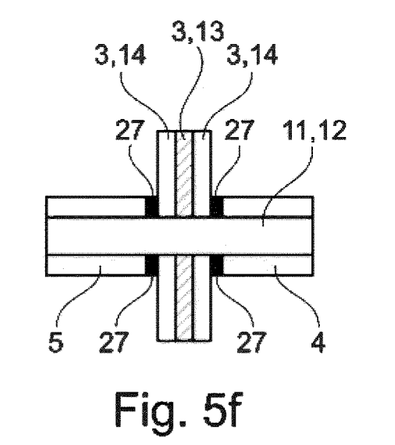

In FIG. 5f, the anode 4 and the cathode 5 are connected to one another via a connecting pin 12, which is integrally formed with the anode 4 and the cathode 5, for example by laser welding. The connecting pin 12 can, for example, be cast onto the anode 4 and onto the cathode 5. It is also possible for the anode 4 and the cathode 5 to be integrally formed with the connecting pin 12. In this case, a subdivision into anode 4, connecting pin 12 and cathode 5 is not possible based on a physical separation line, but only theoretically. In this embodiment too, a seal 27 is arranged in each case between the electrodes 4,5 and the cover 14 of the separating element 3. The seals 27 prevent electrolyte from coming into contact with the connecting pin 12 via the intermediate spaces between the electrodes 4,5 and the covers 14 of the separating element 3.

Figure 5G:
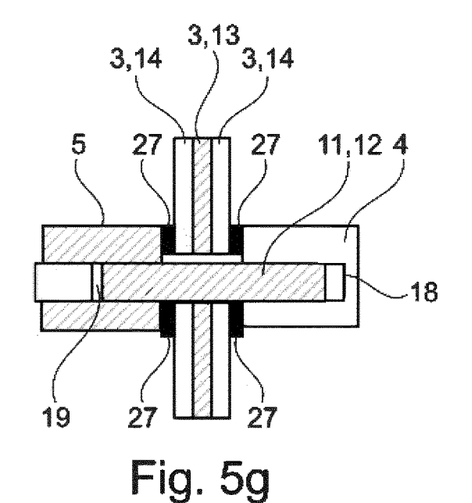

FIG. 5*g* shows a screw connection as an electrically conductive connection 11 between the anode 4 and the cathode 5. The anode 4 is connected to a bushing 18 which has a left-hand thread having a blind hole. The cathode 5 is equipped with a right-hand and continuous thread. The electrodes 4,5 are connected via a threaded pin 12, which has a left-hand thread on the cathode side and a right-hand thread on the anode side. On the cathode side, the threaded pin 12 can be tightened via the through-hole 19 with, for example, a screwdriver. The connection can be shielded, on the cathode side, from the electrolyte by a plastics part comprising a thread as a sealing 28.

Figure 5H:
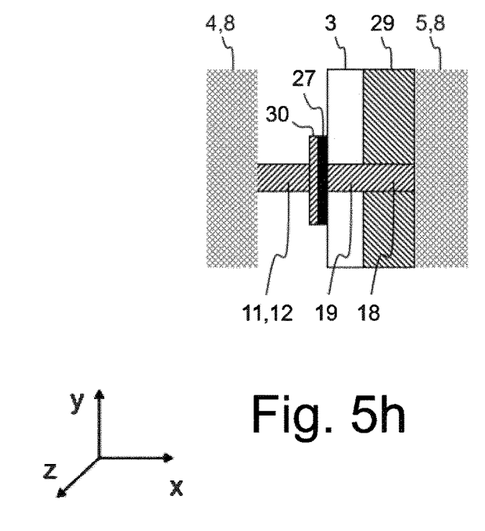

FIG. 5*h* shows a further example of how the anode 4 and the cathode 5 can be connected to one another. In this case, the anode 4 and the cathode 5 are each designed as a metal mesh 8. The anode 4 is connected to the cathode 5 via a connecting pin 12. The connecting pin 12 constitutes an electrically conductive connection 11. A separating element 3 and an electrically conductive plate 29 are arranged between the anode 4 and the cathode 5. Since the plate 29 and the metal mesh 8 are electrically conductive, the plate 29 can also contribute to the function of the cathode 5 and thus be regarded as part of the cathode 5. The separating element 3 has a through-hole 19 for the connecting pin 12. The plate 29 has a bushing 18 for the connecting pin 12. The bushing 18 can be formed in that the plate 29 has a continuous hole into which the connecting pin 12 can be inserted, whereupon the connecting pin 12 can be connected on the cathode side to the plate 29 by laser welding, for example.

On the anode side, the connecting pin 12 is connected to the metal mesh 8 forming the anode 4. Furthermore, the connecting pin 12 has a collar 30 on the anode side, over which a seal 27 can be pressed onto the separating element 3.

Figure 6:
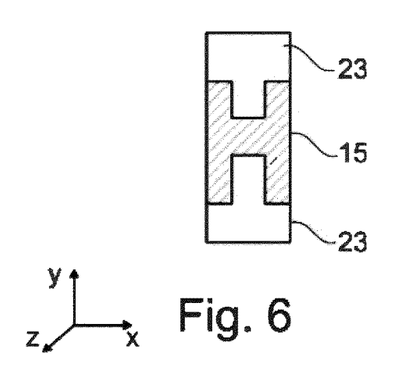
FIG. 6 shows a detail of a boundary for an arrangement according to FIG. 1.

FIG. 6 shows a detail of the boundary 23 of the electrochemical cells 2. A metal stabilizing element 15 is provided in this section. The stabilizing element 15 is designed and arranged such that the boundary 23 is thus stabilized against forces along the stacking direction x.

Figure 7:
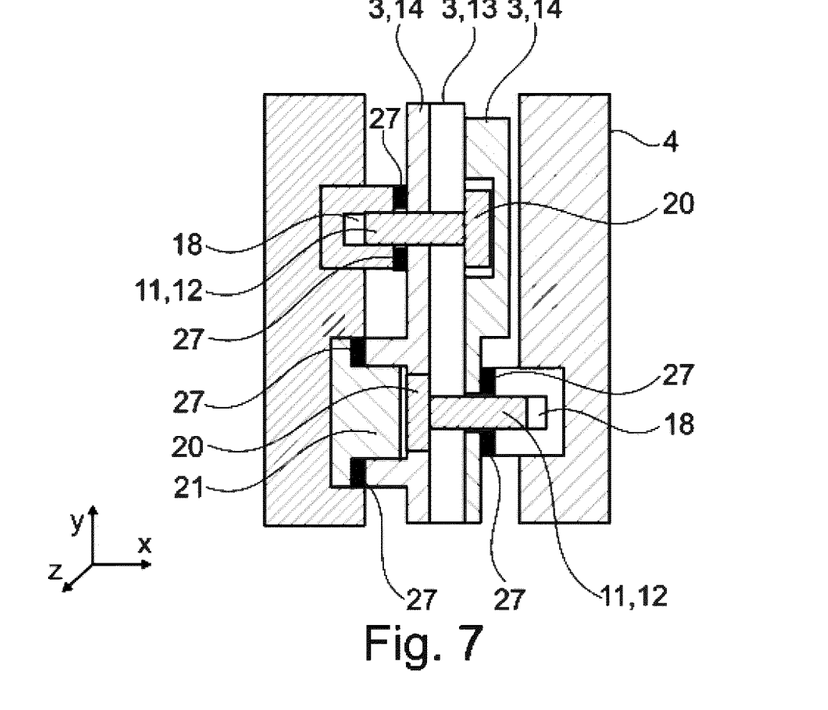
FIG. 7 shows a detailed view of an arrangement according to the invention.

FIG. 7 shows a detailed view of an arrangement 1 according to the invention, which can in principle be designed like the arrangement 1 according to FIG. 1. A cathode 5, a separating element 3 and an anode 4 are shown. The anode 4 and the cathode 5 are each connected to the core 13 of the separating element 3 via a connecting pin 12. The connecting pin 12 can in particular be a screw. The anode 4 and the cathode 5 are electrically conductively connected to one another via the connecting pins 12 and the core 13 of the separating element 3, provided the connecting pins 11 and the core 13 of the separating element 3 are electrically conductive. A seal 27 is arranged in each case between the electrodes 4,5 and the cover 14 of the separating element 3. The seals 27 prevent electrolyte from coming into contact with the connecting pins 12 via the intermediate spaces between the electrodes 4,5 and the covers 14 of the separating element 3.

The anode 4 and the cathode 5 can be connected to one another by first applying a cover 14 to the core 13 of the separating element 3, on the left-hand side. Subsequently, the cathode 5 can be fastened to the core 13 of the separating element 3 by the upper connecting pin 12. A further cover 14 can then be applied to the right-hand side of the core 13 of the separating element 3, and the anode 4 can be fastened to the core 13 by the lower connecting pin 12. Finally, the head 20 of the lower connecting pin 12 can be sealed with a sealing 21. As a result, the core 13 of the separating element 3 is separated from the electrolyte on both sides by the covers 14 or by the sealing 21.

Figure 8:
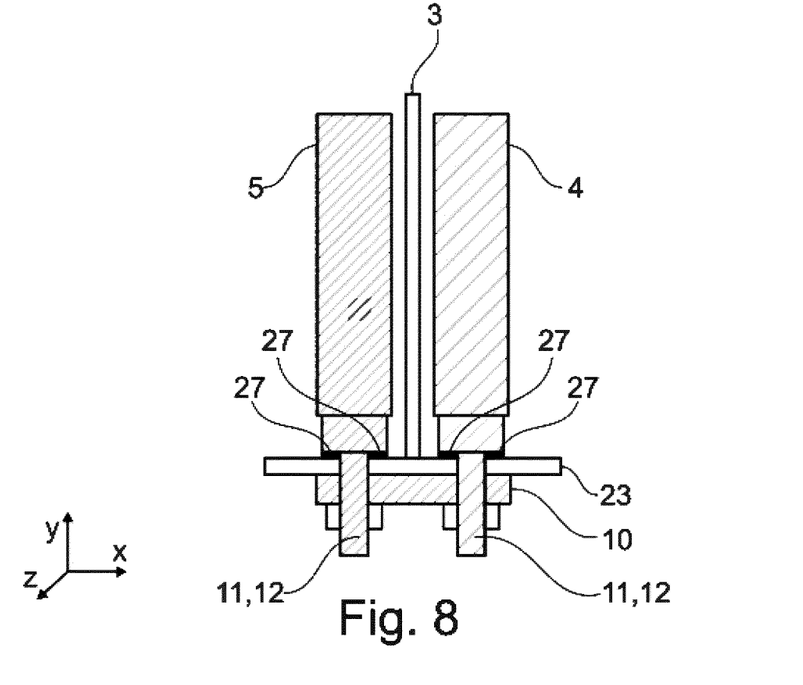
FIG. 8 shows a detailed view of an arrangement according to the invention.

FIG. 8 shows a detailed view of a further arrangement 1 according to the invention, which can in principle be designed like the arrangement 1 according to FIG. 1. In this embodiment, the separating element 3 is formed completely from electrically insulating material. The anode 4 and the cathode 5 are connected to one another via a connecting element 10 arranged outside the boundary 23 of the electrochemical cells 2. The connecting element 10 is also part of the electrically conductive connection 11. The electrically conductive connection 11 passes through the boundary 23. A seal 27 is arranged in each case between the boundary 23 of the electrochemical cells 2 and the electrodes 4,5. The seals 27 prevent electrolyte from coming into contact with the connecting pins 12 via the intermediate spaces between the electrodes 4,5 and the boundary 23 of the electrochemical cells 2.

As a result of the electrically conductive connection 11 between the anodes 4 and the cathodes 5, bipolar plates can be dispensed with in the described arrangement 1. As a result, the arrangement 1 is more cost-effective to produce and more efficient in operation than known arrangement.

LIST OF REFERENCE SIGNS 1 arrangement
2 electrochemical cells
3 separating element
4 anode
5 cathode
6 membrane
7 mesh carrier
8 metal mesh
9 spring element
10 connecting element
11 electrically conductive connection
12 connecting pin
13 core
14 cover
15 stabilizing element
16 fastening element
17 welding point
18 bushing
19 through-hole
20 head
21 sealing
22 nut
23 boundary
24 anode chamber
25 cathode chamber
26 end plate
27 seal
28 sealing
29 plate
30 collar
x stacking direction (first direction)
y second direction
z third direction

The invention claimed is:

1. An arrangement comprising a plurality of electrochemical cells arranged adjoining one another in a stacking direction (x), wherein adjacent ones of the electrochemical cells are separated from one another by a respective electrically insulating separating element, wherein the electrochemical cells each have an anode chamber comprising an anode, a cathode chamber comprising a cathode, and a membrane arranged between the anode chamber and the cathode chamber, wherein the anodes are each connected to the cathode of the electrochemical cell following in the stacking direction (x) via an electrically conductive connection, and wherein the electrically conductive connections pass through the separating element arranged between the respective anode and the respective cathode wherein the anodes and/or the cathodes each are implemented in the manner of skeletal construction with each having a plurality of mesh carriers and a metal mesh fastened thereto, and wherein the electrically conductive connections each comprise at least one connecting pin between the respective anode and the respective cathode.

2. The arrangement according to claim 1, wherein the electrically conductive connection is separated from the respective anode chamber and the respective cathode chamber by a casing and/or a seal.

3. The arrangement according to claim 1, wherein at least one respective spring element is provided for each of the metal meshes, said spring element being designed to tension the metal mesh away from the closest separating element in each case.

4. The arrangement according to claim 1, wherein the electrically conductive connections each comprise a connecting element arranged outside a boundary of the electrochemical cells.

5. The arrangement according to claim 1, wherein the separating elements each have an electrically conductive core and an electrically insulating cover, and wherein the electrically conductive connections each comprise the electrically conductive core of the separating element arranged between the respective anode and the respective cathode.

6. The arrangement according to claim 1, wherein the electrochemical cells are delimited by a boundary made of plastics, and wherein metal stabilizing elements are provided within the boundary.

7. The arrangement according to claim 1, wherein the electrical connections each comprise two connecting pins which point in opposite directions.

8. The arrangement according to claim 1, wherein the anode and the cathode are formed by a respective metal mesh, wherein the arrangement further comprises an electrically conductive plate, wherein the metal mesh forming the cathode is connected to the plate, wherein the electrically conductive connection is formed with a connecting pin which is connected to the anode and which is connected to the plate.

* * * * *